US011915394B2

(12) United States Patent
Moreira et al.

(10) Patent No.: US 11,915,394 B2
(45) Date of Patent: Feb. 27, 2024

(54) SELECTIVE PROCESSING OF ANOMALOUS PIXELS SYSTEMS AND METHODS

(71) Applicant: Teledyne FLIR Commercial Systems, Inc., Goleta, CA (US)

(72) Inventors: Julie R. Moreira, Goleta, CA (US); Stephanie Lin, Buellton, CA (US)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 0 days.

(21) Appl. No.: 17/725,502

(22) Filed: Apr. 20, 2022

(65) Prior Publication Data
US 2022/0366541 A1  Nov. 17, 2022

Related U.S. Application Data

(60) Provisional application No. 63/187,321, filed on May 11, 2021.

(51) Int. Cl.
*G06T 5/00* (2006.01)
*H04N 23/68* (2023.01)
*H04N 23/80* (2023.01)

(52) U.S. Cl.
CPC .......... *G06T 5/002* (2013.01); *H04N 23/681* (2023.01); *H04N 23/80* (2023.01); *G06T 2207/10048* (2013.01); *G06T 2207/20201* (2013.01); *G06T 2207/30168* (2013.01)

(58) Field of Classification Search
CPC .......... G06T 5/002; G06T 2207/10048; G06T 2207/20201; G06T 2207/30168; H04N 23/681; H04N 23/80; H04N 25/671
See application file for complete search history.

(56) References Cited

U.S. PATENT DOCUMENTS

| 9,900,526 | B2 | 2/2018 | Kostrzewa et al. | |
| 11,012,648 | B2 | 5/2021 | Kostrzewa et al. | |
| 2013/0321671 | A1* | 12/2013 | Cote | H04N 25/67 348/241 |
| 2015/0304582 | A1* | 10/2015 | Hirota | H04N 25/134 348/49 |

(Continued)

FOREIGN PATENT DOCUMENTS

| CN | 1917590 | 2/2007 |
| WO | WO 2014/100786 | 6/2014 |

*Primary Examiner* — Gevell V Selby
(74) *Attorney, Agent, or Firm* — Haynes and Boone, LLP

(57) ABSTRACT

Techniques are provided to identify, correct, and/or replace anomalous pixels. In one example, a method includes receiving an image frame comprising a plurality of pixels arranged in a plurality of rows and columns. The pixels comprise image data associated with a scene and fixed pattern noise introduced by an imaging device. The method also includes performing a first process on a first set of the pixels to determine associated correction terms configured to reduce the fixed pattern noise, and applying the correction terms to the first set of the pixels in response to the first process. The method also includes performing a second process on a second set of the pixels to determine whether to replace the second set of the pixels to reduce the fixed pattern noise, and replacing at least a subset of the second set of the pixels in response to the second process. Additional methods and systems are also provided.

20 Claims, 10 Drawing Sheets

(56) References Cited

U.S. PATENT DOCUMENTS

| | | | |
|---|---|---|---|
| 2016/0080671 A1* | 3/2016 | Okazawa | H04N 25/683 348/246 |
| 2016/0182841 A1* | 6/2016 | Iwasaki | H04N 25/63 348/362 |
| 2017/0374305 A1 | 12/2017 | Kostrzewa et al. | |

* cited by examiner

SELECTIVE PROCESSING OF ANOMALOUS PIXELS SYSTEMS AND METHODS

CROSS REFERENCE TO RELATED APPLICATIONS

This application claims priority to and the benefit of U.S. Provisional Patent Application No. 63/187,321 filed May 11, 2021 and entitled "SELECTIVE PROCESSING OF ANOMALOUS PIXELS SYSTEMS AND METHODS," which is hereby incorporated by reference in its entirety.

TECHNICAL FIELD

The present invention relates generally to image processing and, more particularly, to detection of anomalous pixels in images.

BACKGROUND

Various types of imaging devices are used to capture images (e.g., image frames) in response to electromagnetic radiation received from desired scenes of interest. Typically, these imaging devices include sensors arranged in a plurality of rows and columns, with each sensor providing a corresponding pixel of a captured image frame, and each pixel having an associated pixel value corresponding to the received electromagnetic radiation.

One or more pixels may exhibit anomalous behavior due to hardware imperfections, manufacturing tolerances, and/or other causes. Different processes may be used to identify, correct, and/or replace anomalous pixels. For example, in some cases, pixels exhibiting small amounts of fixed pattern noise may be identified using certain processing techniques and correction terms may be applied to their associated pixel values. In other cases, pixels exhibiting large amounts of fixed pattern noise may be identified using different processing techniques and their associated pixel values may be replaced.

These various techniques may utilize different amounts of processing resources, motion detection, and/or other factors. As a result, applying only a single processing technique without discretion may result in inefficient allocation of processing resources, reduced accuracy in pixel values, and/or other drawbacks.

SUMMARY

In one embodiment, a method includes receiving an image frame comprising a plurality of pixels arranged in a plurality of rows and columns, wherein the pixels comprise image data associated with a scene and fixed pattern noise introduced by an imaging device; performing a first process on a first set of the pixels to determine associated correction terms configured to reduce the fixed pattern noise; applying the correction terms to the first set of the pixels in response to the first process; performing a second process on a second set of the pixels to determine whether to replace the second set of the pixels to reduce the fixed pattern noise; and replacing at least a subset of the second set of the pixels in response to the second process.

In another embodiment, a system includes an imager configured to capture an image frame comprising a plurality of pixels arranged in a plurality of rows and columns, wherein the pixels comprise image data associated with a scene and fixed pattern noise introduced by the system; and a logic device configured to: perform a first process on a first set of the pixels to determine associated correction terms configured to reduce the fixed pattern noise, apply the correction terms to the first set of the pixels in response to the first process, perform a second process on a second set of the pixels to determine whether to replace the second set of the pixels to reduce the fixed pattern noise, and replace at least a subset of the second set of the pixels in response to the second process.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
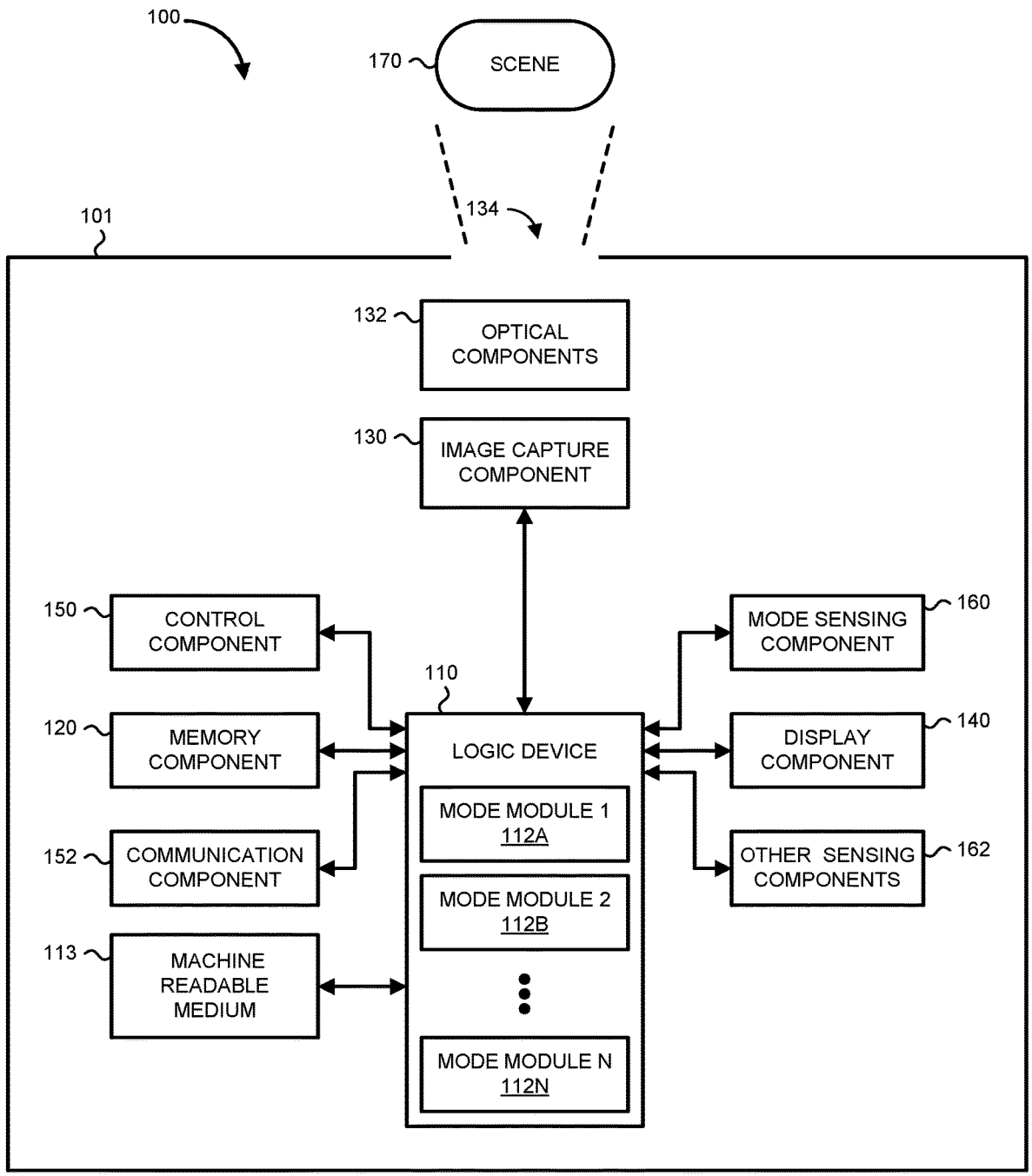
FIG. 1 illustrates a block diagram of an imaging system in accordance with an embodiment of the disclosure.

In accordance with embodiments disclosed herein, various techniques are provided to correct and/or replace anomalous pixel values in captured image frames (e.g., still image frames and/or video image frames). Such image frames may be captured in response electromagnetic radiation (e.g., irradiance) at one or more wavebands, such as thermal infrared, near infrared, visible light, and/or other wavelength ranges received from a scene.

Spatial pattern noise reduction processing may be performed to generate and apply pixel-wise correction terms to reduce fixed pattern noise in the captured image frames (e.g., to identify and correct fixed anomalous pixel values within a limited range). Linearity processing may be performed to identify and replace pixel values exhibiting fixed pattern noise that fall outside a range of values and are not otherwise correctable using correction terms from the spatial pattern noise reduction processing. For example, such linearity processing may identify pixels exhibiting values that deviate from an expected linear response in comparison with other neighbor pixels (e.g., how well a pixel's value matches the slope of neighbor pixel values).

The spatial pattern noise reduction processing and the linearity processing may be selectively performed on pixel values of captured image frames to provide efficient processing for an imaging system. For example, by selectively performing the spatial pattern noise reduction processing on a first set of pixels with pixel values exhibiting lower magnitude anomalies and selectively performing the linearity processing on a second set of pixels with pixel values exhibiting higher magnitude anomalies, anomalous pixel values of varying magnitudes can be detected and either corrected or replaced in runtime infrared imaging systems based upon the magnitude of the anomalous behavior and/or other parameters. Thresholds and communication may be provided between the various processing techniques such that the advantages of the different processing techniques may be realized to perform appropriate processing under different anomaly conditions.

By selectively performing spatial pattern noise reduction processing and linearity processing, different degrees of pixel defects may be reduced by the more appropriate type of processing during various circumstances. For example, in some embodiments, spatial pattern noise reduction processing may rely on the presence of motion and may limit the amount of correction applied to each pixel. On the other hand, linearity processing may require substantially more processing resources. Thus, by performing the more intensive linearity processing only on pixels that cannot be otherwise conveniently corrected by spatial pattern noise reduction (e.g., when motion is not present and therefore a pixel cannot be determined whether it is contributing to fixed pattern noise, or when a pixel would require a correction term greater than a maximum available correction term), processing resources can me more effectively managed and reduced during runtime operation.

FIG. 1 illustrates a block diagram of an imaging system 100 in accordance with an embodiment of the disclosure. Imaging system 100 may be used to capture and process image frames in accordance with various techniques described herein. In one embodiment, various components of imaging system 100 may be provided in a housing 101, such as a housing of a camera, a personal electronic device (e.g., a mobile phone), or other system. In another embodiment, one or more components of imaging system 100 may be implemented remotely from each other in a distributed fashion (e.g., networked or otherwise).

In one embodiment, imaging system 100 includes a logic device 110, a memory component 120, an image capture component 130, optical components 132 (e.g., one or more lenses configured to receive electromagnetic radiation through an aperture 134 in housing 101 and pass the electromagnetic radiation to image capture component 130), a display component 140, a control component 150, a communication component 152, a mode sensing component 160, and a sensing component 162.

In various embodiments, imaging system 100 may implemented as an imaging device, such as a camera, to capture image frames, for example, of a scene 170 (e.g., a field of view). Imaging system 100 may represent any type of camera system which, for example, detects electromagnetic radiation (e.g., irradiance) and provides representative data (e.g., one or more still image frames or video image frames). For example, imaging system 100 may represent a camera that is directed to detect one or more ranges (e.g., wavebands) of electromagnetic radiation and provide associated image data. Imaging system 100 may include a portable device and may be implemented, for example, as a handheld device and/or coupled, in other examples, to various types of vehicles (e.g., a land-based vehicle, a watercraft, an aircraft, a spacecraft, or other vehicle) or to various types of fixed locations (e.g., a home security mount, a campsite or outdoors mount, or other location) via one or more types of mounts. In still another example, imaging system 100 may be integrated as part of a non-mobile installation to provide image frames to be stored and/or displayed.

Logic device 110 may include, for example, a microprocessor, a single-core processor, a multi-core processor, a microcontroller, a programmable logic device configured to perform processing operations, a digital signal processing (DSP) device, one or more memories for storing executable instructions (e.g., software, firmware, or other instructions), and/or or any other appropriate combination of processing device and/or memory to execute instructions to perform any of the various operations described herein. Logic device 110 is adapted to interface and communicate with components 120, 130, 140, 150, 160, and 162 to perform method and processing steps as described herein. Logic device 110 may include one or more mode modules 112A-112N for operating in one or more modes of operation (e.g., to operate in accordance with any of the various embodiments disclosed herein). In one embodiment, mode modules 112A-112N are adapted to define processing and/or display operations that may be embedded in logic device 110 or stored on memory component 120 for access and execution by logic device 110. In another aspect, logic device 110 may be adapted to perform various types of image processing techniques as described herein.

In various embodiments, it should be appreciated that each mode module 112A-112N may be integrated in software and/or hardware as part of logic device 110, or code (e.g., software or configuration data) for each mode of operation associated with each mode module 112A-112N, which may be stored in memory component 120. Embodiments of mode modules 112A-112N (i.e., modes of operation) disclosed herein may be stored by a machine readable medium 113 in a non-transitory manner (e.g., a memory, a hard drive, a compact disk, a digital video disk, or a flash memory) to be executed by a computer (e.g., logic or processor-based system) to perform various methods disclosed herein.

In various embodiments, the machine readable medium 113 may be included as part of imaging system 100 and/or separate from imaging system 100, with stored mode modules 112A-112N provided to imaging system 100 by coupling the machine readable medium 113 to imaging system 100 and/or by imaging system 100 downloading (e.g., via a wired or wireless link) the mode modules 112A-112N from the machine readable medium (e.g., containing the non-transitory information). In various embodiments, as described herein, mode modules 112A-112N provide for improved camera processing techniques for real time applications, wherein a user or operator may change the mode of operation depending on a particular application, such as an off-road application, a maritime application, an aircraft application, a space application, or other application.

Memory component 120 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, logic device 110 is adapted to execute software stored in memory component 120 and/or machine-readable medium 113 to perform various methods, processes, and modes of operations in manner as described herein.

Image capture component 130 includes, in one embodiment, one or more sensors (e.g., any type visible light, infrared, or other type of detector, including a detector implemented as part of a focal plane array) for capturing image signals representative of an image, of scene 170. In one embodiment, the sensors of image capture component 130 provide for representing (e.g., converting) a captured thermal image signal of scene 170 as digital data (e.g., via an analog-to-digital converter included as part of the sensor or separate from the sensor as part of imaging system 100).

Logic device 110 may be adapted to receive image signals from image capture component 130, process image signals (e.g., to provide processed image data), store image signals or image data in memory component 120, and/or retrieve stored image signals from memory component 120. Logic device 110 may be adapted to process image signals stored in memory component 120 to provide image data (e.g., captured and/or processed image data) to display component 140 for viewing by a user.

Display component 140 includes, in one embodiment, an image display device (e.g., a liquid crystal display (LCD)) or various other types of generally known video displays or monitors. Logic device 110 may be adapted to display image data and information on display component 140. Logic device 110 may be adapted to retrieve image data and information from memory component 120 and display any retrieved image data and information on display component 140. Display component 140 may include display electronics, which may be utilized by logic device 110 to display image data and information. Display component 140 may receive image data and information directly from image capture component 130 via logic device 110, or the image data and information may be transferred from memory component 120 via logic device 110.

In one embodiment, logic device 110 may initially process a captured thermal image frame and present a processed image frame in one mode, corresponding to mode modules 112A-112N, and then upon user input to control component 150, logic device 110 may switch the current mode to a different mode for viewing the processed image frame on display component 140 in the different mode. This switching may be referred to as applying the camera processing techniques of mode modules 112A-112N for real time applications, wherein a user or operator may change the mode while viewing an image frame on display component 140 based on user input to control component 150. In various aspects, display component 140 may be remotely positioned, and logic device 110 may be adapted to remotely display image data and information on display component 140 via wired or wireless communication with display component 140, as described herein.

Control component 150 includes, in one embodiment, a user input and/or interface device having one or more user actuated components, such as one or more push buttons, slide bars, rotatable knobs or a keyboard, that are adapted to generate one or more user actuated input control signals. Control component 150 may be adapted to be integrated as part of display component 140 to operate as both a user input device and a display device, such as, for example, a touch screen device adapted to receive input signals from a user touching different parts of the display screen. Logic device 110 may be adapted to sense control input signals from control component 150 and respond to any sensed control input signals received therefrom.

Control component 150 may include, in one embodiment, a control panel unit (e.g., a wired or wireless handheld control unit) having one or more user-activated mechanisms (e.g., buttons, knobs, sliders, or others) adapted to interface with a user and receive user input control signals. In various embodiments, the one or more user-activated mechanisms of the control panel unit may be utilized to select between the various modes of operation, as described herein in reference to mode modules 112A-112N. In other embodiments, it should be appreciated that the control panel unit may be adapted to include one or more other user-activated mechanisms to provide various other control operations of imaging system 100, such as auto-focus, menu enable and selection, field of view (FoV), brightness, contrast, gain, offset, spatial, temporal, and/or various other features and/or parameters. In still other embodiments, a variable gain signal may be adjusted by the user or operator based on a selected mode of operation.

In another embodiment, control component 150 may include a graphical user interface (GUI), which may be integrated as part of display component 140 (e.g., a user actuated touch screen), having one or more images of the user-activated mechanisms (e.g., buttons, knobs, sliders, or others), which are adapted to interface with a user and receive user input control signals via the display component 140. As an example for one or more embodiments as discussed further herein, display component 140 and control component 150 may represent appropriate portions of a smart phone, a tablet, a personal digital assistant (e.g., a wireless, mobile device), a laptop computer, a desktop computer, or other type of device.

Mode sensing component 160 includes, in one embodiment, an application sensor adapted to automatically sense a mode of operation, depending on the sensed application (e.g., intended use or implementation), and provide related information to logic device 110. In various embodiments, the application sensor may include a mechanical triggering mechanism (e.g., a clamp, clip, hook, switch, push-button, or others), an electronic triggering mechanism (e.g., an electronic switch, push-button, electrical signal, electrical connection, or others), an electromechanical triggering mechanism, an electro-magnetic triggering mechanism, or some combination thereof. For example for one or more embodiments, mode sensing component 160 senses a mode of operation corresponding to the imaging system's 100 intended application based on the type of mount (e.g., accessory or fixture) to which a user has coupled the imaging system 100 (e.g., image capture component 130). Alternatively, the mode of operation may be provided via control component 150 by a user of imaging system 100 (e.g., wirelessly via display component 140 having a touch screen or other user input representing control component 150).

Furthermore in accordance with one or more embodiments, a default mode of operation may be provided, such as for example when mode sensing component 160 does not sense a particular mode of operation (e.g., no mount sensed or user selection provided). For example, imaging system 100 may be used in a freeform mode (e.g., handheld with no mount) and the default mode of operation may be set to handheld operation, with the image frames provided wirelessly to a wireless display (e.g., another handheld device with a display, such as a smart phone, or to a vehicle's display).

Mode sensing component 160, in one embodiment, may include a mechanical locking mechanism adapted to secure the imaging system 100 to a vehicle or part thereof and may include a sensor adapted to provide a sensing signal to logic device 110 when the imaging system 100 is mounted and/or secured to the vehicle. Mode sensing component 160, in one embodiment, may be adapted to receive an electrical signal and/or sense an electrical connection type and/or mechanical mount type and provide a sensing signal to logic device 110. Alternatively or in addition, as discussed herein for one or more embodiments, a user may provide a user input via control component 150 (e.g., a wireless touch screen of display component 140) to designate the desired mode (e.g., application) of imaging system 100.

Logic device 110 may be adapted to communicate with mode sensing component 160 (e.g., by receiving sensor information from mode sensing component 160) and image capture component 130 (e.g., by receiving data and information from image capture component 130 and providing and/or receiving command, control, and/or other information to and/or from other components of imaging system 100).

In various embodiments, mode sensing component 160 may be adapted to provide data and information relating to system applications including a handheld implementation and/or coupling implementation associated with various types of vehicles (e.g., a land-based vehicle, a watercraft, an aircraft, a spacecraft, or other vehicle) or stationary applications (e.g., a fixed location, such as on a structure). In one embodiment, mode sensing component 160 may include communication devices that relay information to logic device 110 via wireless communication. For example, mode sensing component 160 may be adapted to receive and/or provide information through a satellite, through a local broadcast transmission (e.g., radio frequency), through a mobile or cellular network and/or through information beacons in an infrastructure (e.g., a transportation or highway information beacon infrastructure) or various other wired or wireless techniques (e.g., using various local area or wide area wireless standards).

In another embodiment, imaging system 100 may include one or more other types of sensing components 162, including environmental and/or operational sensors, depending on the sensed application or implementation, which provide information to logic device 110 (e.g., by receiving sensor information from each sensing component 162). In various embodiments, other sensing components 162 may be adapted to provide data and information related to environmental conditions, such as internal and/or external temperature conditions, lighting conditions (e.g., day, night, dusk, and/or dawn), humidity levels, specific weather conditions (e.g., sun, rain, and/or snow), distance (e.g., laser rangefinder), and/or whether a tunnel, a covered parking garage, or that some type of enclosure has been entered or exited. Accordingly, other sensing components 160 may include one or more conventional sensors as would be known by those skilled in the art for monitoring various conditions (e.g., environmental conditions) that may have an effect (e.g., on the image appearance) on the data provided by image capture component 130.

In some embodiments, other sensing components 162 may include devices that relay information to logic device 110 via wireless communication. For example, each sensing component 162 may be adapted to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques. In some embodiments, other sensing components 162 may include one or more motion sensors (e.g., accelerometers, gyroscopes, micro-electromechanical system (MEMS) devices, and/or others as appropriate).

In various embodiments, components of imaging system 100 may be combined and/or implemented or not, as desired or depending on application requirements, with imaging system 100 representing various operational blocks of a system. For example, logic device 110 may be combined with memory component 120, image capture component 130, display component 140, and/or mode sensing component 160. In another example, logic device 110 may be combined with image capture component 130 with only certain operations of logic device 110 performed by circuitry (e.g., a processor, a microprocessor, a microcontroller, a logic device, or other circuitry) within image capture component 130. In still another example, control component 150 may be combined with one or more other components or be remotely connected to at least one other component, such as logic device 110, via a wired or wireless control device so as to provide control signals thereto.

In some embodiments, communication component 152 may be implemented as a network interface component (NIC) adapted for communication with a network including other devices in the network. In various embodiments, communication component 152 may include a wireless communication component, such as a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components adapted for communication with a network. As such, communication component 152 may include an antenna coupled thereto for wireless communication purposes. In other embodiments, the communication component 152 may be adapted to interface with a DSL (e.g., Digital Subscriber Line) modem, a PSTN (Public Switched Telephone Network) modem, an Ethernet device, and/or various other types of wired and/or wireless network communication devices adapted for communication with a network.

In various embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) adapted to communicate with other communication networks, such as the Internet. As such, in various embodiments, the imaging system 100 may be associated with a particular network link such as for example a URL (Uniform Resource Locator), an IP (Internet Protocol) address, and/or a mobile phone number.

Figure 2:
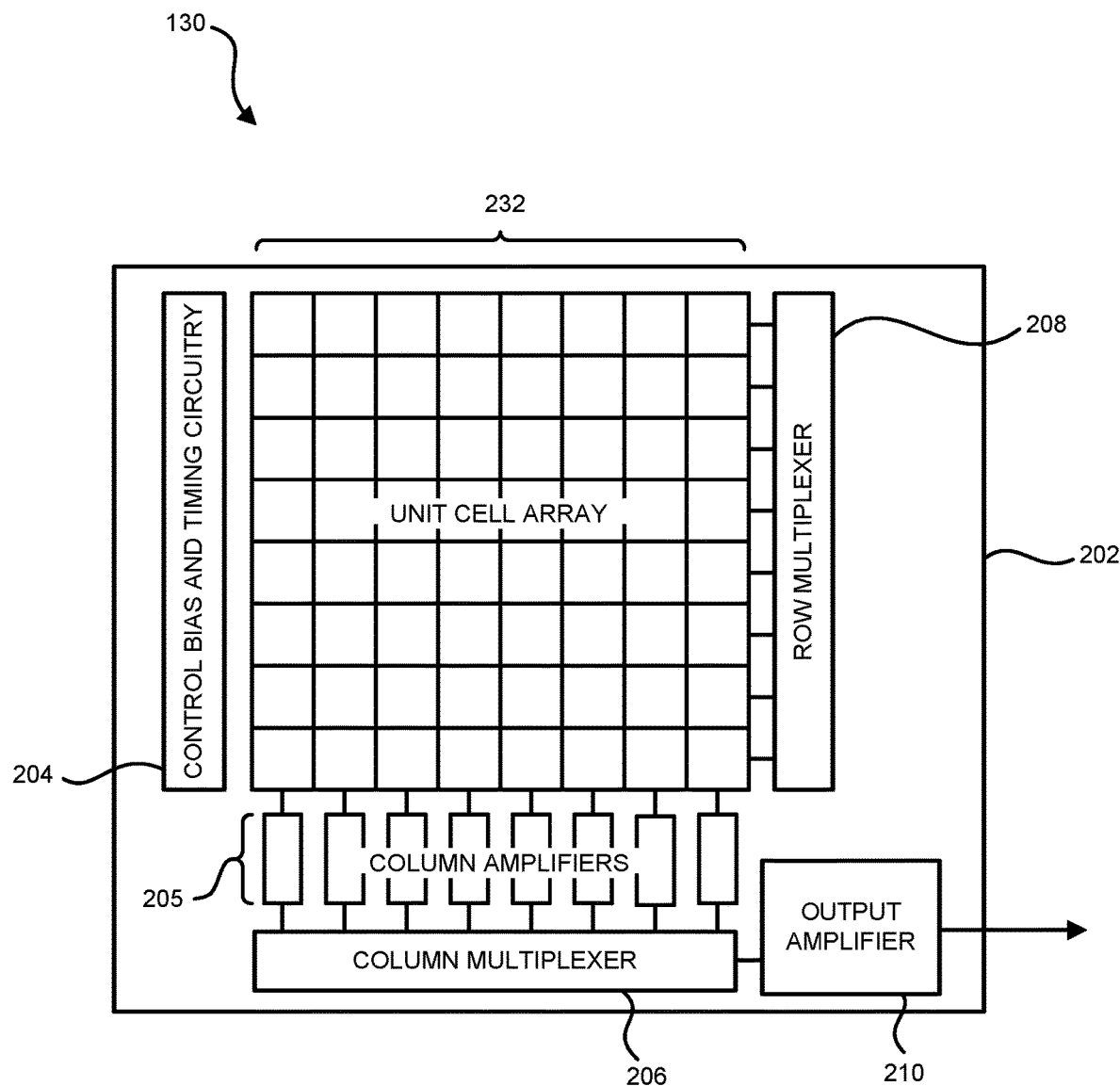
FIG. 2 illustrates a block diagram of an image capture component in accordance with an embodiment of the disclosure.

FIG. 2 illustrates a block diagram of image capture component 130 in accordance with an embodiment of the disclosure. In this illustrated embodiment, image capture component 130 is a thermal imager implemented as a focal plane array (FPA) including an array of unit cells 232 and a read out integrated circuit (ROIC) 202. Each unit cell 232 may be provided with an infrared detector (e.g., a microbolometer or other appropriate sensor) and associated circuitry to provide image data for a pixel of a captured thermal image frame. In this regard, time-multiplexed electrical signals may be provided by the unit cells 232 to ROIC 202.

ROIC 202 includes bias generation and timing control circuitry 204, column amplifiers 205, a column multiplexer 206, a row multiplexer 208, and an output amplifier 210. Image frames captured by infrared sensors of the unit cells 232 may be provided by output amplifier 210 to logic device 110 and/or any other appropriate components to perform various processing techniques described herein. Although an 8 by 8 array is shown in FIG. 2, any desired array configuration may be used in other embodiments. Further descriptions of ROICs and infrared sensors (e.g., microbolometer circuits) may be found in U.S. Pat. No. 6,028,309 issued Feb. 22, 2000 which is incorporated by reference herein in its entirety.

Figure 3:
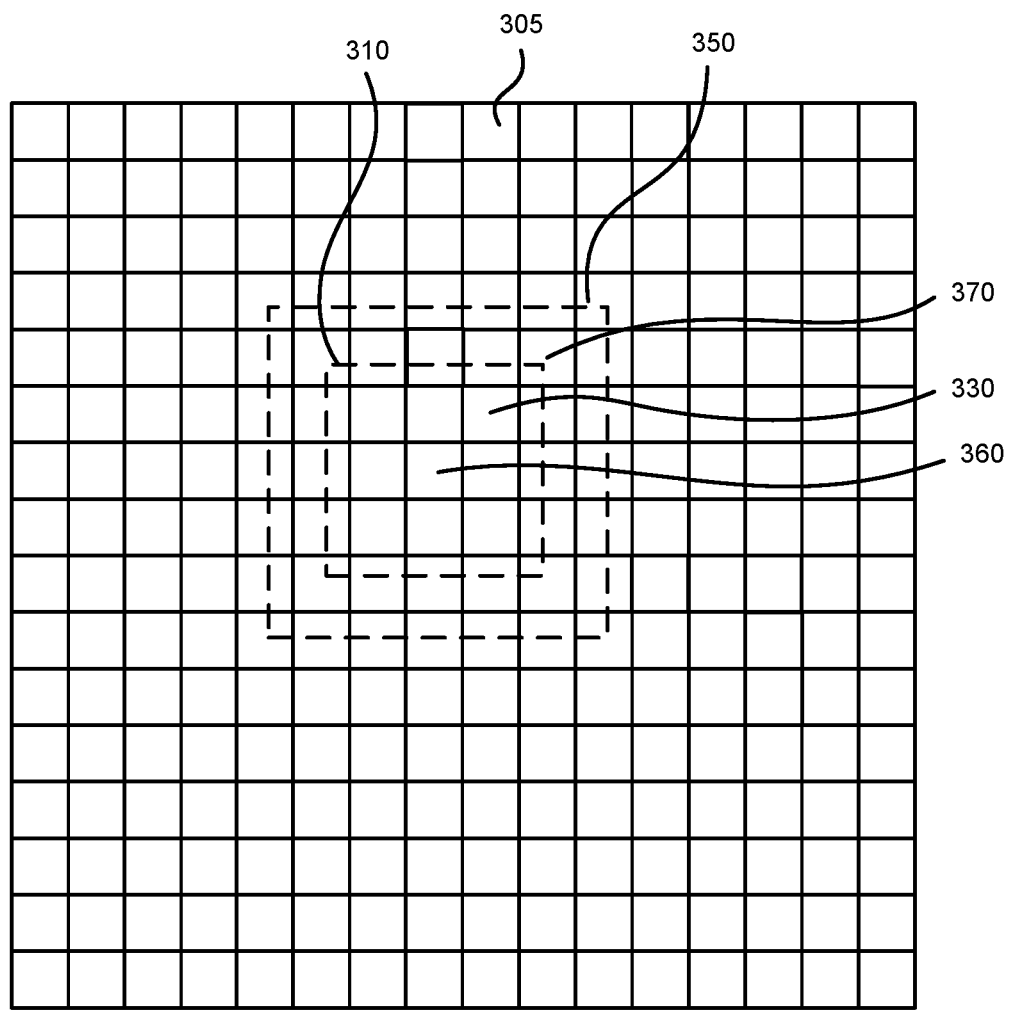
FIG. 3 illustrates an image frame in accordance with an embodiment of the disclosure.

FIG. 3 illustrates an image frame 300 provided by image capture component 130 in accordance with an embodiment of the disclosure. Although image frame 300 is represented as a 16 by 16 pixel image frame, any desired size may be used. As shown, image frame 300 includes a plurality of pixels 305 arranged in columns and rows. In accordance with anomalous pixel detection techniques discussed herein, various groups (e.g., sets or neighborhoods) of pixels may be identified, also referred to as kernels. For example, FIG. 3 identifies a 3 by 3 pixel kernel 310 comprising a grid of pixels 305 having a center pixel 360 and 8 neighbor pixels 330. FIG. 3 also identifies a 5 by 5 pixel kernel 350 comprising a grid of pixels 305 having center pixel 360 and 24 neighbor pixels 370. Although particular kernel sizes of 3 by 3 and 5 by 5 are shown, larger or smaller kernel sizes may be used in any embodiments discussed herein as appropriate.

As discussed, the present disclosure provides various techniques to identify pixels exhibiting anomalous behavior in captured image frames (e.g., image frame 300). Such anomalous behavior may be caused, for example, by defects, calibration errors, and/or other problems with the particular unit cell 232 within the FPA that is associated with the anomalous pixel. Such anomalous behavior may be exhibited, for example, by center pixel 360 exhibiting a pixel value that is outside an expected range of values when compared to the neighbor pixels 330 of kernel 310 and/or neighbor pixels 370 of kernel 350 in accordance with various processing techniques discussed herein.

Figure 4:
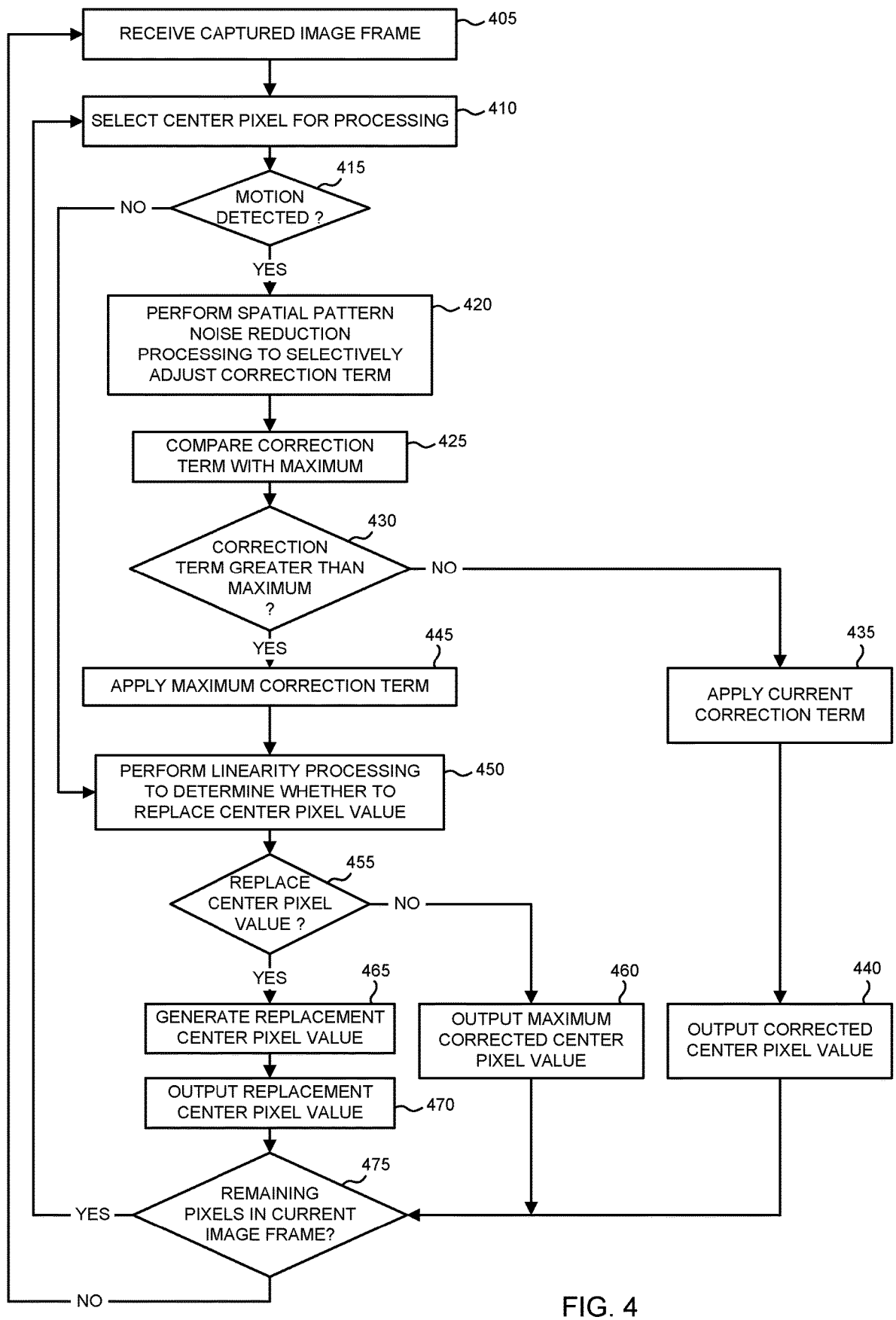
FIG. 4 illustrates a process of performing selective anomalous pixel processing in accordance with an embodiment of the present disclosure.

FIG. 4 illustrates a process of performing selective anomalous pixel processing in accordance with an embodiment of the present disclosure. In some embodiments, the process of FIG. 4 may be performed by logic device 110 of imaging system 100, such as an image processing pipeline provided by logic device 110. In some embodiments, the process of FIG. 4 may be performed during runtime operation of imaging system 100 to permit realtime detection, correction, and/or replacement of anomalous pixels.

In block 405, logic device 110 receives image frame 300 from image capture component 130. In block 410, logic device 110 selects a pixel of image frame 300 for anomalous pixel processing. In the present discussion, pixel 360 is selected for processing (e.g., pixel 360 is used as a center pixel with corresponding kernels 310 and 350). However, it will be appreciated that any pixel 305 of image frame 300 may be selected as a center pixel with its corresponding kernels, and that blocks 410 through 475 may be repeated to select any or all pixels 305 of image frame 300 for processing in successive iterations of such blocks.

In block 415, logic device 110 detects whether imaging system 100 is experiencing motion (e.g., whether a motion threshold has been exceeded). In some embodiments, motion may be detected by comparing frame-to-frame changes exhibited by multiple captured image frames 300 (e.g., image frames successively captured in repeated iterations of block 405). In other embodiments, motion may be detected by one or more motion sensors of other sending components 162. In other embodiments, motion may be detected by a temporal noise reduction block provided by logic device 110 and implemented in accordance with any of the various techniques set forth in U.S. Pat. No. 10,425,603 issued Sep. 24, 2019 which is incorporated by reference herein in its entirety.

If motion is detected, then the process of FIG. 4 continues to block 420 where spatial pattern noise reduction processing is performed. Otherwise, the process continues to block 450 where linearity processing is performed. Thus, it will be appreciated that the spatial pattern noise reduction processing of block 420 may be conditioned on the presence of motion. In this regard, if small differences in pixel values remain among neighbor pixels 330 and center pixel 360 even in the presence of motion (e.g., when portions of scene 170 captured in image frame 300 may be expected to be blurred due to the motion and therefore would be expected to cause such small differences to be reduced or not present), then such differences may be deemed to be caused by fixed pattern noise associated with anomalous pixels (e.g., pixels exhibiting undesired fixed offsets in their associated pixel values). However, if motion is not present, it may be difficult to discern whether small differences between the values of center pixel 360 and neighbor pixels 330 are associated with undesired fixed pattern noise or desired information from scene 170. As a result, the spatial pattern noise reduction processing of block 420 (e.g., used to detect small variations in pixel values) may be bypassed in favor of the linearity processing of block 450 (e.g., used to detect large variations in pixel values) when motion is not detected.

In block 420, logic device 110 performs spatial pattern noise reduction processing to determine (e.g., calculate) a correction term associated with center pixel 360. In some embodiments, the spatial pattern noise reduction processing of block 420 may be performed in accordance with any of the various noise reduction techniques set forth in U.S. Pat. No. 9,208,542 issued Dec. 8, 2015 which is incorporated by reference herein in its entirety.

Figure 5:
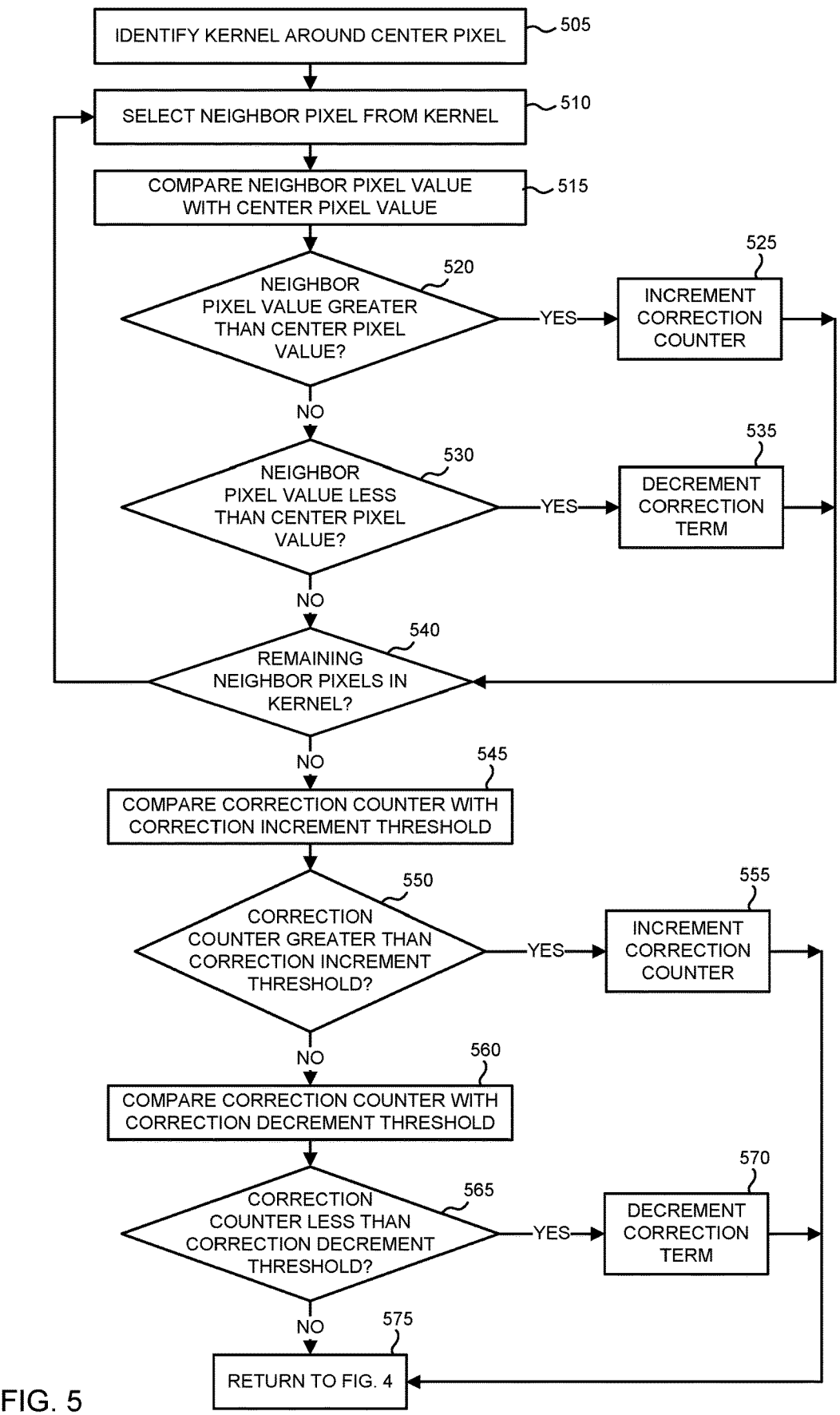
FIG. 5 illustrates a process of performing spatial pattern noise reduction processing to determine correction terms to be applied to anomalous pixels in accordance with an embodiment of the present disclosure.

FIG. 5 illustrates a process of performing spatial pattern noise reduction processing performed by logic device 110 in block 420 of FIG. 4 in accordance with an embodiment of the present disclosure. In the process of FIG. 5, logic device 110 selectively adjusts a correction counter (e.g., stored in memory component 120) which provides an overall assessment as to whether neighbor pixels 330 exhibit generally higher or lower pixel values in relation to center pixel 360. If the correction counter is greater than a correction increment threshold (e.g., stored in memory component 120, the correction increment threshold indicating that neighbor pixels 330 exhibit sufficiently higher pixel values to deem center pixel 360 as exhibiting an anomalously low pixel value), then logic device 110 may increase a correction term (e.g., stored in memory component 120) to be applied to center pixel 360. If the correction counter is lower than a correction decrement threshold (e.g., stored in memory component 120, the correction decrement threshold indicating that neighbor pixels 330 exhibit sufficiently lower pixel values to deem center pixel 360 as exhibiting an anomalously high pixel value), then logic device 110 may decrease the correction term to be applied to center pixel 360. As a result, the correction term (e.g., stored in memory component 120) may be selectively increased, decreased, or remain unchanged based on the pixel values of neighbor pixels 330 in relation to center pixel 360 as indicated by the correction counter.

Turning now to the specific blocks of FIG. 5, in block 505, logic device 110 selects kernel 310 around center pixel 360 (e.g., center pixel 360 previously selected in block 410). In block 510, logic device 110 selects one of neighbor pixels 330 within kernel 310.

In block 515, compares the pixel value of the currently selected neighbor pixel 330 with the pixel value of center pixel 360. If the neighbor pixel 330 value is greater than the center pixel 360 value (block 520), then logic device 110 increments the correction counter as discussed (block 525) and the process continues to block 540. Otherwise, the process continues to block 530.

If the neighbor pixel 330 value is less than the center pixel 360 value (block 530), then logic device 110 decrements the correction counter as discussed (block 535) and the process continues to block 540. Otherwise, the process continues to block 540.

If any neighbor pixels 330 remain to be processed (block 540), then the process returns to block 510. Otherwise, the process continues to block 545. Thus, blocks 510 through 540 may be repeated for all neighbor pixels 330 of kernel 310 (e.g., repeated 7 times to finish processing all 8 neighbor pixels 330 in the case of a 3 by 3 kernel 310). As a result, the correction counter may be incremented and/or decremented as appropriate until a final correction counter value is determined for center pixel 360 in relation to kernel 310.

In block 545, logic device 110 compares the correction counter value with the correction increment threshold as discussed. If the correction counter value is greater than the correction increment threshold (block 550), then logic device 110 increments a correction term associated with center pixel 360 (block 555) and the process continues to block 575. Otherwise, the process continues to block 560.

In block 560, logic device 110 compares the correction counter value with the correction decrement threshold as discussed. If the correction counter value is less than the correction decrement threshold (block 565), then logic device 110 decrements the correction term associated with center pixel 360 (block 565) and the process continues to block 575. Otherwise, no adjustment will be made to the correction term associated with center pixel 360 (e.g., the correction counter value is between the upper correction increment threshold and the lower correction decrement threshold) and the process continues to block 575 where the process returns to FIG. 4.

Turning again to FIG. 4, after block 420 has completed, the correction term will have been selectively adjusted based on the spatial pattern noise reduction processing of FIG. 5. In block 425, logic device 110 compares the correction term with a maximum correction term (e.g., stored in memory component 120). In this regard, in some cases, it may be preferable to limit the correction term applied to the value of center pixel 360. For example, a correction term that is abnormally high (e.g., incremented sufficiently high during the process of FIG. 5 to be greater than the maximum correction term) may indicate an extreme abnormality that may not be effectively fixed with larger correction terms (e.g., a dead pixel that is nonresponsive and/or exhibits a static value). In such cases and/or other appropriate cases, the correction term applied to the center pixel 360 value may be limited to the maximum correction term and the center pixel 360 may undergo the further linearity processing of block 450 to be potentially replaced.

If the current correction term provided by block 420 is greater than the maximum correction term (block 430), then logic device 110 applies the current correction term to the value of center pixel 360 (block 435; e.g., the value of center pixel 360 is offset by the correction term determined in block 420), logic device outputs the corrected value of center pixel 360 (block 440), and the process continues to block 475. Otherwise, the process continues to block 445. In block 445, logic device 110 applies the maximum correction term to the value of center pixel 360.

In block 450, logic device 110 performs linearity processing on the value of center pixel 360 to potentially identify center pixel 360 as an anomalous pixel that should be replaced. In this regard, the value of center pixel 360 processed in block 450 may be either the original value of center pixel 360 (e.g., if no motion was detected in block 415) or the maximum corrected value of center pixel 360 (e.g., if the maximum correction term was applied to the value of center pixel 360 in block 445). In some embodiments, the linearity processing of block 450 may be performed in accordance with any of the various techniques set forth in U.S. Pat. No. 10,425,603 issued Sep. 24, 2019 which is incorporated by reference herein in its entirety.

Figure 6:
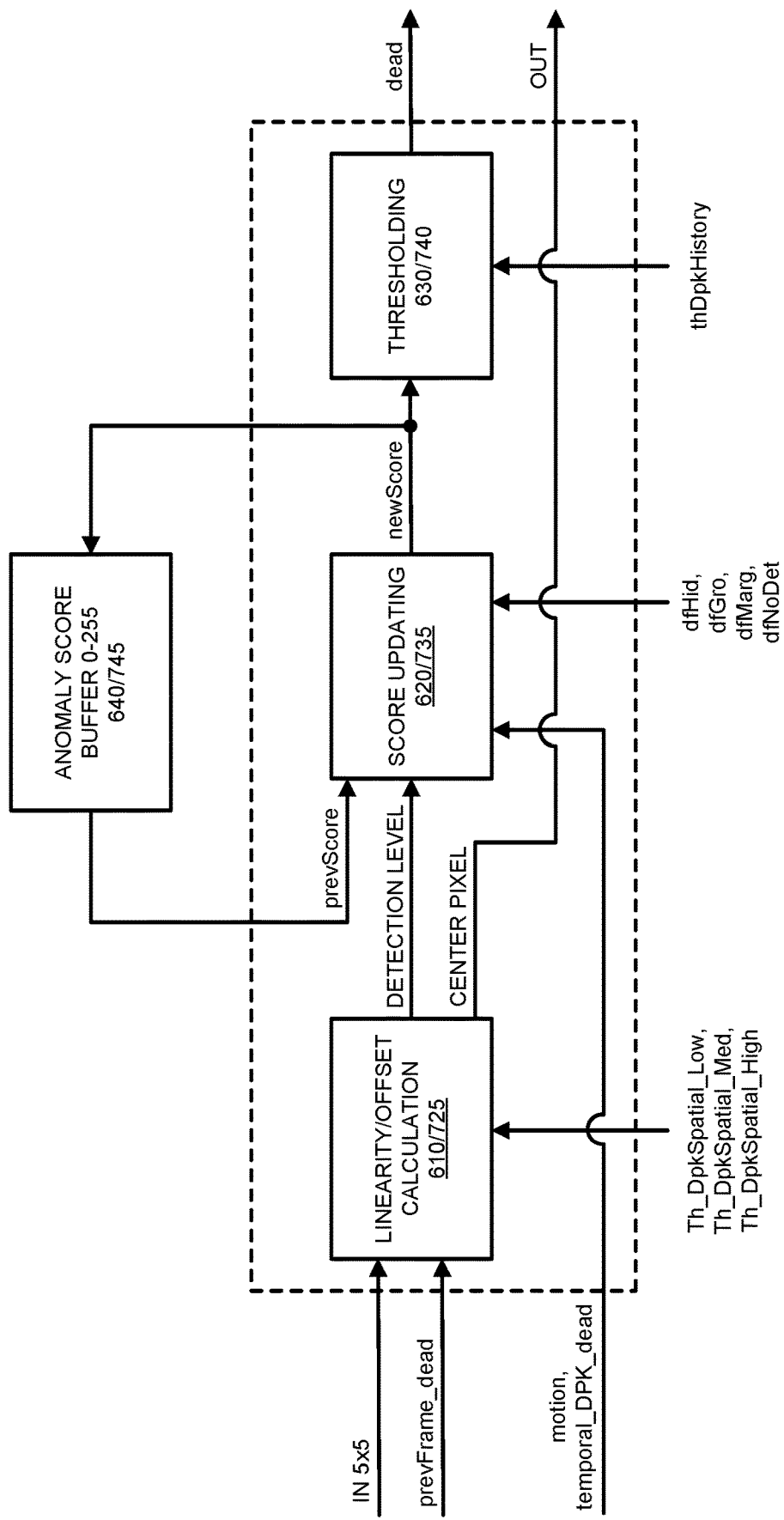
FIG. 6 illustrates a block diagram of linearity processing to identify anomalous pixels for replacement in accordance with an embodiment of the disclosure.
Figure 7:
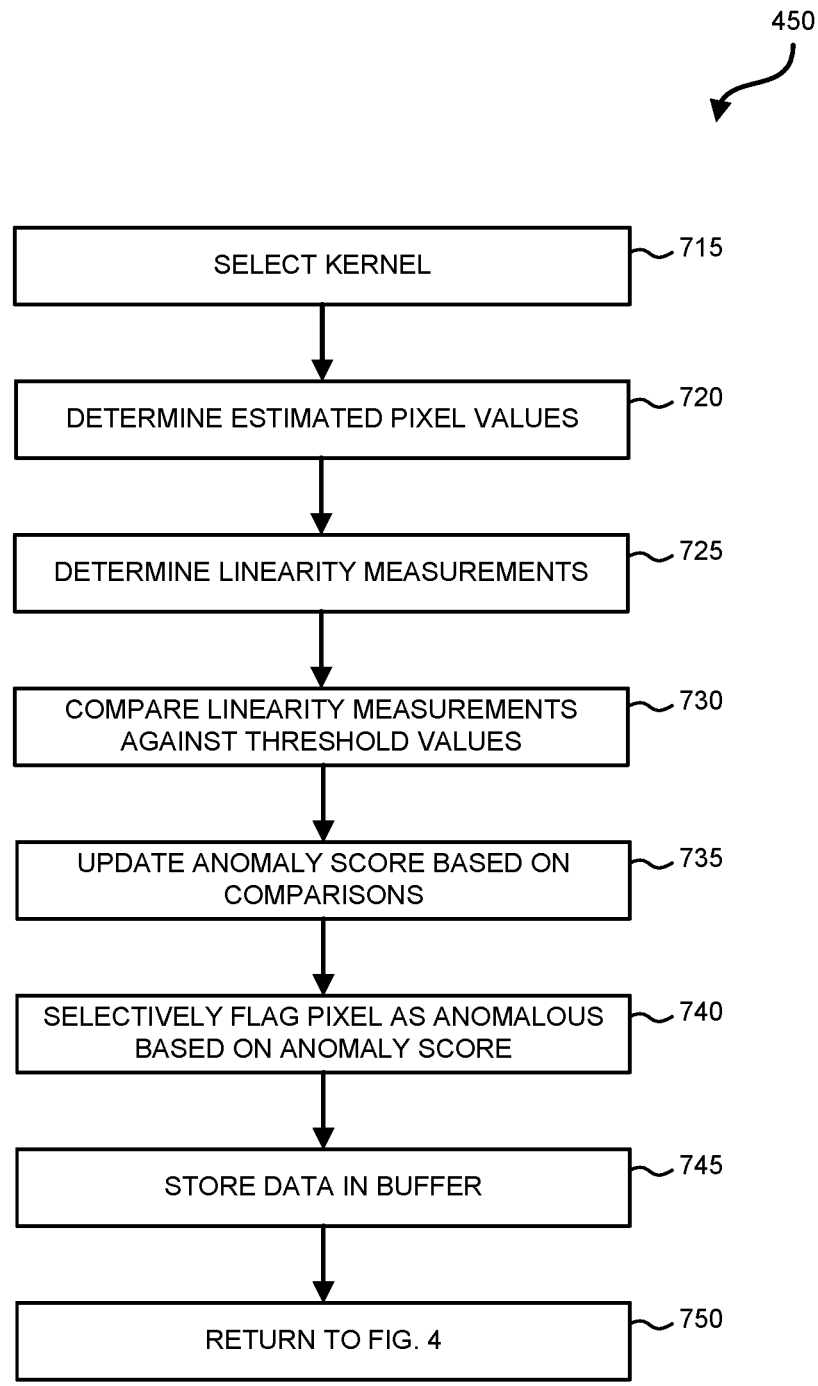
FIG. 7 illustrates a process of performing linearity processing to identify anomalous pixels for replacement in accordance with an embodiment of the present disclosure.

FIG. 6 illustrates a block diagram of linearity processing to identify anomalous pixels for replacement that is performed in block 450 of FIG. 4 in accordance with an embodiment of the disclosure. FIG. 7 illustrates a process of performing the linearity processing of block 450 of FIG. 4 in accordance with embodiments of the disclosure. As shown in FIG. 6, the linearity processing may be performed by various blocks 610, 620, and 630 (e.g., implemented by logic device 110) and block 640 (e.g., implemented by memory component 120) corresponding to blocks 725, 735, 740, and 745 of FIG. 7, respectively.

Figure 8:
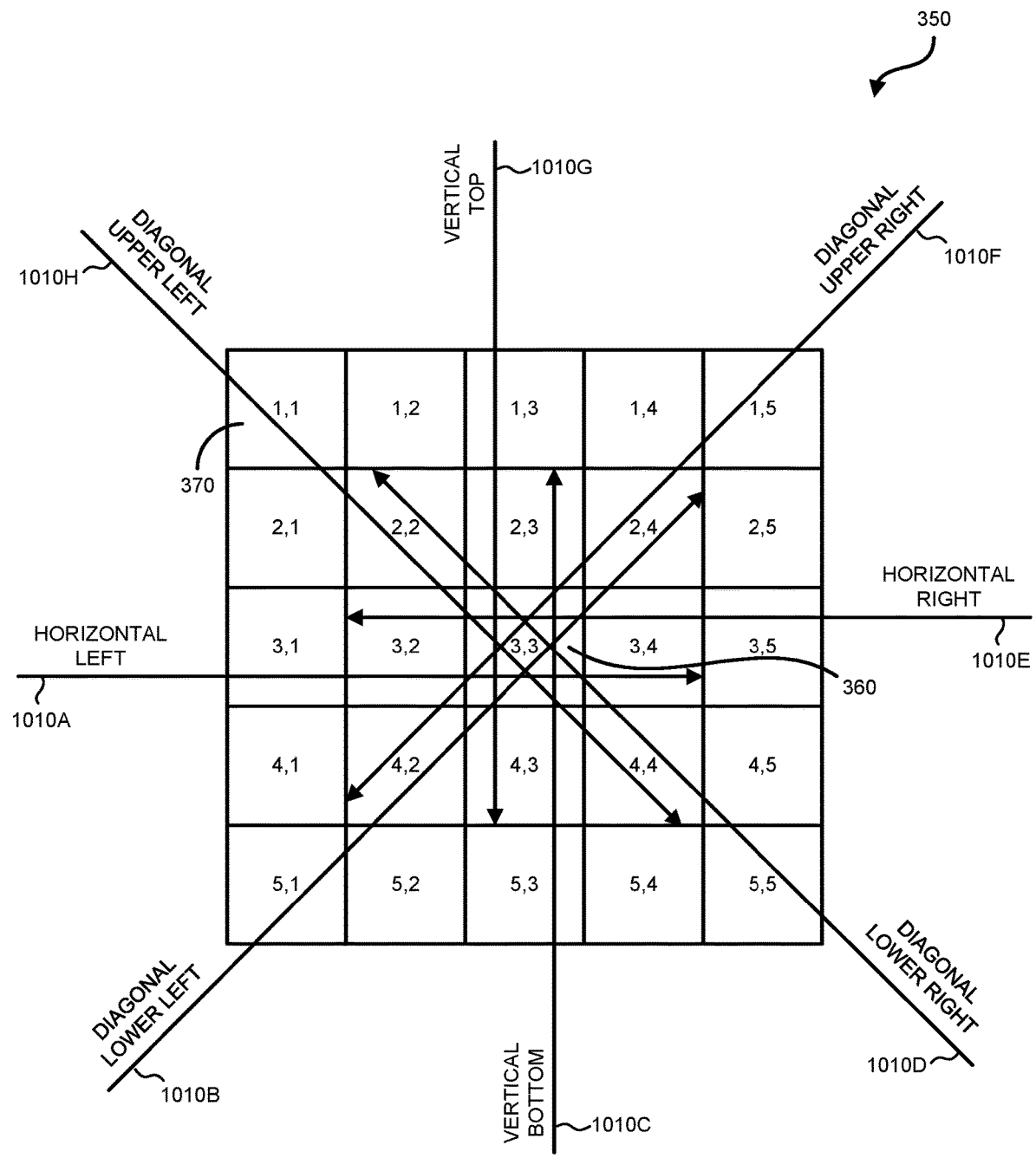
FIGS. 8, 9A-B, and 10A-B illustrate example pixel value calculations performed during the process of FIG. 7 in accordance with embodiments of the disclosure.

Turning now to the process of FIG. 7, in block 715, logic device 110 selects kernel 350 that includes center pixel 360. In block 720, logic device 110 determines estimated pixel values for neighbor pixels 370 of the selected kernel 350. For example, FIG. 8 illustrates kernel 350 with center pixel 360 and neighbor pixels 370. FIG. 8 further identifies 8 vectors 1010A-H, each of which originates at an outer neighbor pixel 370 and extends over 4 pixels including center pixel 360. For example, vector 1010A originates at a first pixel (labeled 3, 1), and extends through a second pixel (labeled 3, 2), a third pixel (labeled 3, 3 corresponding to center pixel 360), and a fourth pixel (labeled 3, 4).

Also in block 720, logic device 110 calculates estimated values for the third and fourth pixels of each of vectors 1010A-H based on a linear extrapolation of the known values for the corresponding first and second pixels (e.g., using the slope defined by the first and second pixel values).

In some embodiments, the estimated third pixel value $P3_{est}$ may be determined by the following equation 1, where $P1_{val}$ and $P2_{val}$ are known values of the first and second pixels:

$$P3_{est} = -1*P1_{val} + 2*P2_{val} \qquad \text{(equation 1)}$$

In some embodiments, the estimated fourth pixel value $P4_{est}$ may be determined by the following equation 2:

$$P4_{est} = -2*P1_{val} + 3*P2_{val} \qquad \text{(equation 2)}$$

In block 725, logic device 110 determines linearity measurements (e.g., values) for each of vectors 1010A-G based on the estimated pixel values determined in block 720. For example, the linearity measurement for a given vector 1010 may be determined by the following equation 3, where $P3_{val}$ and $P4_{val}$ are known values of the third and fourth pixels:

$$\text{Linearity} = |P3_{val} - P3_{est}| - |P4_{val} - P4_{est}| \qquad \text{(equation 3)}$$

Thus, in equation 3, the linearity measurement for each vector corresponds to how close the estimated third and fourth pixel values are in relation to the actual third and fourth pixel values. (e.g., the extent to which the actual values of the third and fourth pixels deviate from the expected linear extrapolated values). In this regard, positive linearity measurements are associated with the third pixel having a greater deviation than the fourth pixel, and negative linearity measurements are associated with the fourth pixel having a greater deviation than the third pixel.

Figures 9A, 9B:
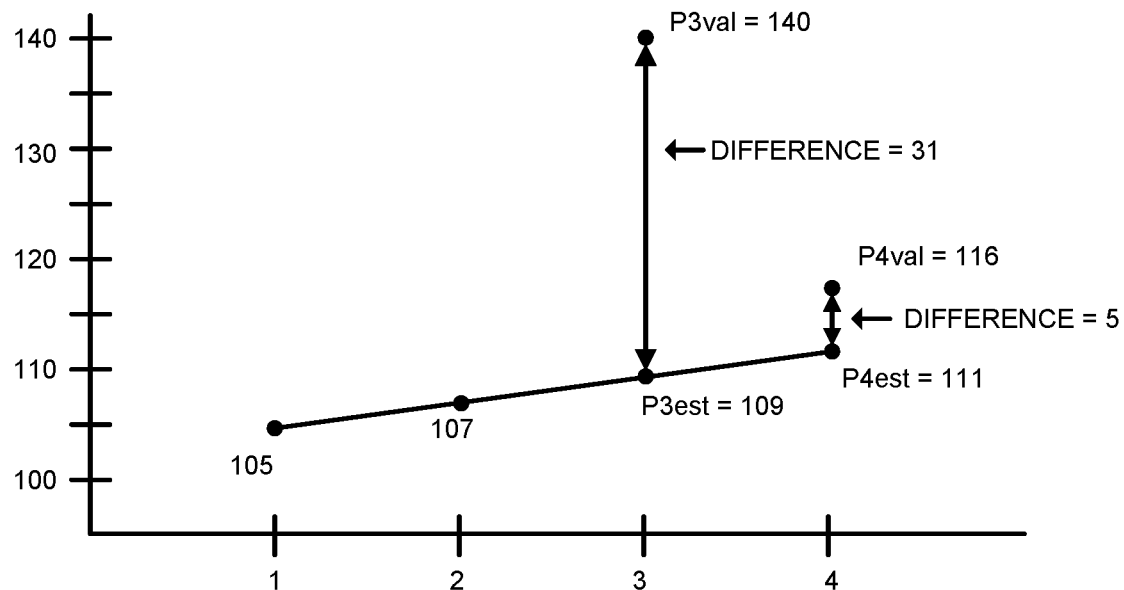

FIGS. 9A-B illustrate example pixel value calculations performed during the process of FIG. 7 in accordance with embodiments of the disclosure. Specifically, FIG. 9A illustrates an example set of actual values for pixels of kernel 350. FIG. 9B illustrates actual and estimated pixel values for vector 1010A of FIG. 9A, and the differences between actual and estimated values for the third and fourth pixels. Applying equation 3 to the values shown in FIGS. 9A-B results in a linearity measurement of 26 for vector 1010A (e.g., |140-109|-|116-111|).

Table 1 illustrates third and fourth pixel values and the resulting linearity measurements for each of vectors 1010A-H when applied to the example values shown in FIG. 9A.

TABLE 1

| Vector | $P3_{val}$ | $P3_{est}$ | $P4_{val}$ | $P4_{est}$ | Linearity |
|---|---|---|---|---|---|
| 1010A | 140 | 109 | 116 | 111 | 26 |
| 1010B | 140 | 108 | 110 | 108 | 30 |
| 1010C | 140 | 116 | 98 | 109 | 13 |
| 1010D | 140 | 104 | 106 | 96 | 26 |
| 1010E | 140 | 112 | 107 | 108 | 27 |
| 1010F | 140 | 108 | 108 | 106 | 30 |
| 1010G | 140 | 106 | 123 | 114 | 25 |
| 1010H | 140 | 112 | 112 | 118 | 22 |

Figures 10A, 10B:
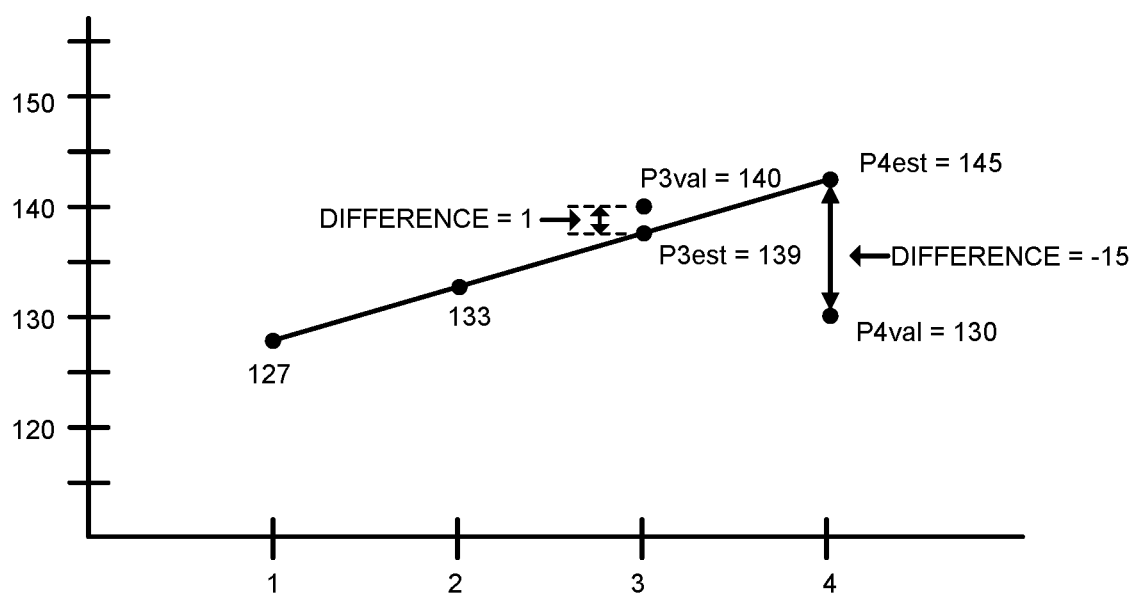

FIGS. 10A-B illustrate additional example pixel value calculations performed during the process of FIG. 7 in accordance with embodiments of the disclosure. Specifically, FIG. 10A illustrates another example set of actual values for pixels of kernel 350. FIG. 10B illustrates actual and estimated pixel values for vector 1010A of FIG. 10A, and the differences between actual and estimated values for the third and fourth pixels. Applying equation 3 to the values shown in FIGS. 10A-B, results in a linearity measurement of −14 for vector 1010A (e.g., |140-139|-|130-145|).

Table 2 illustrates third and fourth pixel values and the resulting linearity measurements for each of vectors 1010A-H when applied to the example values shown in FIG. 10A.

TABLE 2

| Vector | $P3_{val}$ | $P3_{est}$ | $P4_{val}$ | $P4_{est}$ | Linearity |
|---|---|---|---|---|---|
| 1010A | 140 | 139 | 130 | 145 | −14 |
| 1010B | 140 | 141 | 137 | 147 | −9 |
| 1010C | 140 | 142 | 128 | 150 | −20 |
| 1010D | 140 | 136 | 130 | 143 | −9 |
| 1010E | 140 | 140 | 133 | 150 | −17 |
| 1010F | 140 | 142 | 135 | 147 | −10 |
| 1010G | 140 | 141 | 136 | 154 | −17 |
| 1010H | 140 | 141 | 129 | 152 | −22 |

In block 730, logic device 110 compares the linearity measurements against one or more threshold values. For example, in some embodiments, three threshold values may be used (e.g., low, medium, and high), each within a range of 0 to 32 (e.g., 10, 20, and 25, respectively). Greater or fewer thresholds may be used in other embodiments. Logic device 110 sums the number of linearity measurements that exceed each of the three thresholds (e.g., to obtain up to a maximum count of 8 for each of the three thresholds).

In some embodiments, linearity measurements may be selectively excluded from the threshold sums if dead pixels are present in their associated vectors (e.g., pixels previously detected as temporally anomalous, spatially anomalous, and/or otherwise abnormal in the current image frame 300 or in a previous image frame). For example, linearity measurements may be excluded from the high and medium threshold sums if any dead pixels are present in their associated vectors. In another example, up to three linearity measurements associated with vectors having one or more dead pixels may be included in the low threshold sum.

In block 735, logic device 110 updates an anomaly score based on the numbers of linearity measurements that exceed the various thresholds and stores the updated anomaly score an anomaly score buffer (e.g., block 640 of FIG. 6). In this regard, score updating block 620 determines an anomaly score for each pixel of the current image frame 300. In some embodiments, the anomaly score may be updated in accordance with the following equation 4:

newScore=((32−*df*)*updateValue+*df**prevScore)/32     (equation 4)

In equation 4, newScore is the updated anomaly score in a range from 0 to 255, df is a damping factor in a range from 0 to 32, updateValue is a score factor having a value of 255 or 0, and prevScore is the previous anomaly score in a range from 0 to 255.

Logic device 110 selects values for the damping factor and the score factor based on the calculated linearity measurements. In this regard, logic device 110 sums the number of linearity measurements that exceed each of the three thresholds (e.g., to obtain up to a maximum count of 8 for each of the three thresholds) and selects values for the damping factor and the score factor based on the sums. For example, Table 3 identifies damping factor and score factor values selected for various linearity measurement sums that exceed the various high, medium, and low thresholds.

TABLE 3

| Degree of Non-Linearity | High Threshold | Medium Threshold | Low Threshold | Damping Factor df | Score Factor updateValue |
|---|---|---|---|---|---|
| extreme | 8 | 8 | 8 | 6 | 255 |
| significant | ≥7 | 8 | 8 | 19 | 255 |
| marginal | ≥6 | ≥7 | 8 | 26 | 255 |
| no detection | other | other | other | 24 | 0 |

As shown in Table 3, the degree of non-linearity exhibited by the third pixel (e.g., center pixel 360 of kernel 350) may be determined by the various threshold counts which result in different values being assigned to the damping factor and score factor values used in equation 4. For example, in cases of greater non-linearity, low values for damping factor df will tend to pull the updated anomaly score newScore up toward the score factor updateValue of 255. However, in other cases, high values for damping factor df will tend to pull the updated anomaly score newScore down.

In block 740, logic device 110 selectively flags the center pixel 360 as spatially anomalous based on the updated anomaly score. In this regard, logic device 110 compares the updated anomaly score with an anomaly score threshold (e.g., a threshold in the range of 0 to 255, such as 217 in some embodiments). If the updated anomaly score exceeds the anomaly score threshold, then the center pixel 360 will be deemed spatially anomalous. In block 745, this determination is stored in an appropriate buffer. The anomaly score (and therefore the spatial anomalous determination) associated with center pixel 360 may change over time as successive image frames are evaluated and the anomaly score is pulled up and down based on the linearity measurements performed on the actual and estimated pixel values of kernel 350.

In some embodiments, the number of successive image frames processed before a temporally anomalous pixel determination is made can depend on the linearity of the imaged scene (e.g., scene 170). For example, the more linear the scene, the more certain that a non-linear center pixel 360 can be identified through high linearity measurement calculations. In this regard, the updated anomaly score can be quickly pulled above the anomaly score threshold if center pixel 360 consistently exhibits non-linear behavior in relation to neighbor pixels 370. For less linear scenes, greater numbers of image frames and/or greater non-linear offsets of center pixel 360 may be needed to pull the updated anomaly score above the anomaly score threshold. In block 575 where the process returns to FIG. 4.

Turning again to FIG. 4, after block 450 has completed, center pixel 360 may be deemed anomalous or non-anomalous (e.g., based on the result of block 740 of FIG. 7). Accordingly, in block 455, logic device 110 uses this result to determine whether the value of center pixel 360 should be replaced (e.g., rather than merely corrected with a correction term). If a non-anomalous result is found, then logic device 110 determines that center pixel 360 should not be replaced and therefore outputs the maximum corrected value of center pixel 360 (block 460; previously applied in block 445), and the process continues to block 475.

If an anomalous result is found, then logic device 110 then logic device 110 determines that center pixel 360 should be replaced and therefore generates a replacement value for center pixel 360 (block 465), outputs the replacement value (block 470), and the process continues to block 475. Various replacement value generation techniques may be used. For example, in some embodiments, the values of one or more neighbor pixels 370 may be averaged, weighted, and/or otherwise processed to generate the replacement value.

In block 475, if additional pixels of image frame 300 remain to be processed, then the process returns to block 410 where another one of pixels 305 is selected as center pixel 360. Accordingly, blocks 410 through 475 may be repeated as desired to perform anomalous pixel detection, correction, and/or replacement for all pixels 305 of image frame 300. Otherwise, the process returns to block 405 where another image frame 300 is received and processed to perform anomalous pixel detection, correction, and/or replacement as discussed.

In view of the present disclosure, it will be appreciated that pixels 305 of image frame that include image data associated with scene 170 and fixed pattern noise introduced by various portions of imaging system 100 (e.g., unit cells 232 and/or any components of imaging system 100) may be selectively processed in accordance with the spatial pattern noise reduction processing of block 420 (e.g., a first process) and/or the linearity processing of block 450 (e.g., a second process). The first process may be performed on at least a first set of the pixels 305 to determine associated correction terms configured to reduce fixed pattern noise, and the correction terms may be applied to the first pixels. A second process may be performed on at least a second set of the pixels 305 to determine whether to replace at least a subset of the second pixels to reduce the fixed pattern noise. In some embodiments, at least a subset of the first set of pixels may overlap with at least a subset of the second set of pixels (e.g., some of pixels 305 may be processed by both block 420 and 450).

Where applicable, various embodiments provided by the present disclosure can be implemented using hardware, software, or combinations of hardware and software. Also where applicable, the various hardware components and/or software components set forth herein can be combined into composite components comprising software, hardware, and/ or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method comprising:
receiving an image frame comprising a plurality of pixels arranged in a plurality of rows and columns, wherein the pixels comprise image data associated with a scene and fixed pattern noise introduced by an imaging system;
detecting whether motion is present at the imaging system;
if motion is detected, performing a first process to determine a correction term configured to reduce the fixed pattern noise for a selected one of the pixels, wherein the first process comprises comparing the selected pixel to a plurality of neighbor pixels of a first kernel;
if motion is not detected, performing a second process to determine whether to replace the selected pixel to reduce the fixed pattern noise, wherein the second process comprises determining a plurality of linearity measurements based on the selected pixel and a plurality of neighbor pixels of a second kernel; and
applying the correction term to the selected pixel in response to the first process or replacing the selected pixel in response to the second process.

2. The method of claim 1, wherein the first process comprises:
adjusting a counter in response to the comparing; and
adjusting the correction term associated with the selected pixel in response to the counter.

3. The method of claim 2, further comprising:
limiting the correction term to a maximum correction term.

4. The method of claim 1, further comprising:
performing the second process if the correction term exceeds a maximum correction term, regardless of whether motion is detected.

5. The method of claim 1, wherein the second process comprises:
identifying the selected pixel as anomalous in response to the linearity measurements.

6. The method of claim 5, further comprising:
updating a spatial anomaly score based on the linearity measurements; and
the identifying comprises comparing the spatial anomaly score to a spatial anomaly score threshold.

7. The method of claim 5, wherein the determining comprises:
calculating a plurality of estimated values for the selected pixel using a plurality of corresponding subsets of the neighbor pixels of the second kernel; and
comparing the estimated values to one or more linearity threshold values to determine the linearity measurements.

8. The method of claim 5, wherein the determining comprises:
identifying a plurality of vectors each comprising the selected pixel and a corresponding subset of the neighbor pixels of the second kernel;
for each vector, calculating an estimated value of the selected pixel using the corresponding subset of the neighbor pixels of the second kernel; and
comparing the estimated values to one or more linearity threshold values to determine the linearity measurements.

9. The method of claim 1, wherein at least a subset of the first kernel overlaps with at least a subset of the second kernel.

10. The method of claim 1, further comprising repeating the method for a plurality of image frames, wherein the image frames are thermal image frames and the imaging system is a thermal camera.

11. A system comprising:
an imager configured to capture an image frame comprising a plurality of pixels arranged in a plurality of rows and columns, wherein the pixels comprise image data associated with a scene and fixed pattern noise introduced by the system; and
a logic device configured to:
detect whether motion is present at the imaging system,
if motion is detected, perform a first process to determine a correction term configured to reduce the fixed pattern noise for a selected one of the pixels, wherein the first process comprises comparing the selected pixel to a plurality of neighbor pixels of a first kernel,
if motion is not detected, perform a second process to determine whether to replace the selected pixel to reduce the fixed pattern noise, wherein the second process comprises determining a plurality of linearity measurements based on the selected pixel and a plurality of neighbor pixels of a second kernel, and
apply the correction term to the selected pixel in response to the first process or replace the selected pixel in response to the second process.

12. The system of claim 11, wherein the first process comprises:
adjusting a counter in response to the comparing; and
adjusting the correction term associated with the selected pixel in response to the counter.

13. The system of claim 12, wherein the logic device is configured to:
limit the correction term to a maximum correction term.

14. The system of claim 11, wherein:
the logic device is configured to perform the second process if the correction term exceeds a maximum correction term, regardless of whether motion is detected.

15. The system of claim 11, wherein the second process comprises:
identifying the selected pixel as anomalous in response to the linearity measurements.

16. The system of claim 15, wherein the logic device is configured to:
update a spatial anomaly score based on the linearity measurements; and
compare the spatial anomaly score to a spatial anomaly score threshold to identify the selected pixel as anomalous.

17. The system of claim 15, wherein the logic device is configured to:
calculate a plurality of estimated values for the selected pixel using a plurality of corresponding subsets of the neighbor pixels; and
compare the estimated values to one or more linearity threshold values to determine the linearity measurements.

18. The system of claim 15, wherein the logic device is configured to:
identify a plurality of vectors each comprising the selected pixel and a corresponding subset of the neighbor pixels;
for each vector, calculate an estimated value of the selected pixel using the corresponding subset of the neighbor pixels; and
compare the estimated values to one or more linearity threshold values to determine the linearity measurements.

19. The system of claim 11, wherein at least a portion of the first set of the pixels overlaps with at least a portion of the second set of the pixels.

20. The system of claim 11, wherein the logic device is configured to perform the first process and the second process for a plurality of image frames, the imager is a thermal imager, the image frames are thermal image frames, and the system is a thermal camera.

* * * * *